United States Patent Office 3,429,755
Patented Feb. 25, 1969

3,429,755
NITROCELLULOSE-BASE PROPELLANT CONTAINING ETHYLENE CYANOHYDRIN
Bernard B. Lampert, Carmichael, Calif., assignor to Aerojet-General Corporation, El Monte, Calif., a corporation of Ohio
No Drawing. Filed Dec. 14, 1967, Ser. No. 693,690
U.S. Cl. 149—100         9 Claims
Int. Cl. C06b 5/02

ABSTRACT OF THE DISCLOSURE

This patent describes nitrocellulose-containing propellants which contain ethylene cyanohydrin (2-cyano ethanol) to permit the rapid curing of the propellant at ambient temperatures.

BACKGROUND OF THE INVENTION

The field of the present invention pertains to nitrocellulose-containing propellants.

Those skilled in the art are familiar with the term "double base" propellants, which refers to nitrocellulose-based binder propellants containing nitroglycerin as the principal plasticizer. Other nitroplastisol propellants which contain nitrocellulose systems and other oxygen-rich plasticizers are also known. Presently, nitrocellulose propellants are cured at temperatures usually above about 110° F., and double base propellants when cured at ambient temperature require very long cure cycles, on the order of 30 days. The use of elevated temperatures and/or long cure cycles to cure nitroplastisol and double base propellants suffer from several disadvantages. For example, isothermal shrinkage for double base propellants is generally greater than 1%. Effective ambient cure would tend to eliminate stress and grain defects without the need for resorting to expensive processing techniques such as pressure cure or programmed cure. Ambient curing would also be desirable to allow the use of additional propellant to replace the closure boots often used in solid propellant motors. In addition, the presently known prolonged cure cycles at ambient temperatures are expensive, tying up cure facilities and reducing production efficiency. According to the present invention, it has now been discovered that ethylene cyanohydrin is a very effective swelling or gelatinizing agent for nitrocellulose, and when used in small concentrations with other plasticizers in double base or nitroplastisol propellants, promotes ambient curing within from about two to six days.

SUMMARY OF THE INVENTION

Briefly, the present invention comprises the use of ethylene cyanohydrin in nitrocellulose propellant systems to provide ambient propellant curing within a period of about two to six days. The ethylene cyanohydrin is used in an effective gelatinizing and swelling amount, normally up to about 3% by weight of the propellant.

Ethylene cyanohydrin is preferably employed in an amount less than 1% by weight of the propellant formulation. At this level ethylene cyanohydrin provides ambient cure in two to six days with the added benefit of increased ballistic potential due to a decrease in the inert fuel concentration. In addition, to its low carbon content, ethylene cyanohydrin is a very fluid liquid with a low melting point, reasonably low vapor pressure, and high flash point, all desirable properties of a nitrocellulose plasticizer.

It is an object of the present invention to provide nitrocellulose-based propellants which are curable at low temperatures, on the order of ambient.

It is also an object of this invention to provide nitrocellulose-based propellants having shortened cure cycles.

Still further, it is an object of this invention to provide a novel propellant having improved properties as a result of reduced shrinkage resulting from the cure conditions.

Specifically it is an object of this invention to utilize nitrocellulose-based propellant formulations containing ethylene cyanohydrin to reduce the time and expense presently entailed in the production of nitrocellulose propellants.

These and other objects and advantages of this invention will be apparent from the following more detailed description.

The use of nitrile plasticizers in double base propellant formulations has been previously known. For example, adiponitrile has long been known to be an effective swelling agent for nitrocellulose. Thermodynamically, however, adiponitrile detracts from the ballistic potential of a propellant formulation, since considerable oxygen must be provided to convert the six carbon atoms to carbon monoxide or carbon dioxide. Hence, it is desirable to employ as little inert plasticizer as possible. Moreover, it has been found that there is little predictability in the relative efficacy of nitrile plasticizers in nitrocellulose propellant formulations. For example, 3-cyano-1, 2-propylene glycol does not gel nitrocellulose at 110° F. and 3,3'-iminodipropionitrile is much less effective at 110° C. than adiponitrile. Ethylene cyanohydrin is thus unique indeed in its ability to gelatinize nitrocellulose.

As those skilled in the art will recognize, the use of ethylene cyanohydrin is not restricted to composite propellants but is also applicable to smokeless propellant formulations such as may be used in conventional cast-in-case or caseless round gun ammunition. In smokeless propellants which contain no metal fuel or perchlorate oxidizer, the concentration of the ethylene cyanohydrin may be as much as 3% by weight depending upon the nature of the principal plasticizer. For example, 3% by weight ethylene cyanohydrin may be used in the case where the plasticizer is a mixture of bis-(dinitropropyl) acetal and bis-(dinitropropyl) formal. Less ethylene cyanohydrin is normally used with triethyleneglycol dinitrate, trimethylolethane trinitrate, and the like.

The invention is now limited exclusively to the use of ethylene cyanohydrin with pyrocellulose guncotton, but is applicable to pyroxylin as well. Lacquers with higher solids content and improved film properties may be expected when formulated to incorporate ethylene cyanohydrin. The invention is not restricted to the use of nitratoethyl-N-nitro-N-methyl carbamate as a coplasticizer with ethylene cyanohydrin. Others, such as triethyleneglycol dinitrate, diethyleneglycol dinitrate, adiponitrile, triacetin, etc., may also be used. The choice and concentration of nitrocellulose-type, principle plasticizer, and coplasticizers determine the concentration of ECH required. Based upon the foregoing considerations, those skilled in the art will be able to select the appropriate amount of ethylene cyanohydrin required for any given propellant formulation. In addition, it will be recognized that the present invention is applicable to the full range of nitrocellulose-containng propellants.

DESCRIPTION OF PREFERRED EMBODIMENTS

The following examples are presented solely to illustrate the invention and should not be regraded as limiting in any way. In the examples, the parts and percentages are by weight unless otherwise indicated.

Example I

The effectiveness of ethylene cyanohydrin as a swelling agent for nitrocellulose was demonstrated by placing one drop of ethylene cyanohydrin on a small quantity of plastisol grade nitrocellulose at room temperature. Almost immediately, the nitrocellulose was gelatinized. After standing, the opaque mass clarified and formed a tough, rubbery binder.

Example II

Ethylene cyanohydrin was first incorporated into a nitroplastisol propellant on a 2 gram batch scale. The propellant had the following composition:

| Ingredient: | Weight percent |
| --- | --- |
| Ammonium perchlorate | 28 |
| Aluminum | 18 |
| Plastisol grade nitrocellulose | 15.88 |
| Resorcinol | 0.5 |
| Triacetin | 1 |
| Ethylene cyanohydrin | 0.50 |
| Trimethylolethane trinitrate | 22.95 |
| Nitratoethyl-N-nitro-N-methyl carbamate | 13.17 |

The slurry was castable and allowed to stand at ambient temperature for three days at which time it was found to have cured.

Following the procedure of Example II, the following propellant was mixed successfully on 65-lb. batch size scale at 65–70° F. The casting viscosity was 358 poise.

| Ingredient: | Weight percent |
| --- | --- |
| Aluminum | 18.00 |
| Ammonium perchlorate | 28.00 |
| Plastisol grade nitrocellulose | 15.88 |
| bis - dinitropropyl acetal/bis - dinitropropyl formal (1/1) | 2.73 |
| Resorcinol | 0.50 |
| Triethyleneglycol dinitrate | 3.50 |
| Trimethylolethane trinitrate | 30.29 |
| Adiponitrile | 0.70 |
| Ethylene cyanohydrin | 0.40 |

The propellant cured at room temperature in about four days. The burning rate at 900 p.s.i.a. was 0.65 in./sec. The Rex hardness of the cured propellant was 70–75. The Shore A hardness was 56–64. The total cure shrinkage was 1.5% by volume. Mechanical properties of the propellant at 77° F. were: nominal maximum stress, 122 p.s.i.; strain at maximum stress, 31%. Initial modulus was 860 p.s.i.

As will be apparent to those skilled in the art, the propellants need not necessarily contain metal fuels such as aluminum.

Following are examples of smokeless propellants:

Example III

| Ingredient: | Weight percent |
| --- | --- |
| Plastisol grade nitrocellulose | 30.0 |
| bis - dinitropropyl acetal/bis-dinitropropyl formal (1/1) | 66.0 |
| Resorcinol | 1.0 |
| Ethylene cyanohydrin | 3.0 |

Theoretical specific impulse for this propellant is 210 lb. f.-sec./lb. m., flame temperature 2845° F., and density 0.051 lb./cu. inch. Mechanical properties at 77° F. were: nominal maximum stress, 100 p.s.i.; strain at maximum stress, 22%; and initial modulus, 860 p.s.i. Burning rate was 0.14 in./sec. at 1000 p.s.i.g., and the pressure exponent was 0.73.

Example IV

| Ingredient: | Weight percent |
| --- | --- |
| Fluid Ball Powder "C" | 40.0 |
| Trimethylolethane trinitrate | 50.0 |
| Nitratoethyl-N-nitro-N-methyl carbamate | 7.0 |
| Ethylene cyanohydrin | 3.0 |

This propellant cured to a Rex hardness of 45 within four days at 80° F. Theoretical specific impulse is 240 lb. f.-sec./lb. m., and density is 0.054 lb./cu. inch. Burning rate was 0.32 in./sec. at 1000 p.s.i.g., and the pressure exponent was 0.71.

Example III above employs Fluid Ball Powder "C," a commercially available (Olin-Mathieson Chemical Co.) nitrocellulose with the following composition: 75% nitrocellulose, 1.5% 2-nitrodiphenylamine, 23% nitroglycerin, 0.4% carbon black, and 0.15% (added) coating agent.

The proportions of binder, plasticizer, oxidizer and the like used in practicing this invention are conventional, and do not form a part of this invention. Hence, there is no need to refer to them therein in greater detail.

The essence of the present invention is the surprising discovery that ethylene cyanohydrin can be used to lower curing temperatures and shorten the cure cycle. The temperatures and times, however, are not critical. Thus, lower temperatures require longer times while higher temperatures shorten the times. In any case, by the practice of this invention, complete cure can be had within several days at about room temperature. The properties of the product produced are enhanced because of the elimination of the exposure to high temperatures for prolonged times.

Thus, the present invention will find immediate application in the field of solid rocket propellants. The propellants of the present invention are castable within a casing, then fitted with a nozzle and igniter. The rocket motor thus fabricated is useful in the defense and space efforts.

Having fully described the invention, it is intended that it be limited only by the lawful scope of the appended claims.

I claim:
1. Novel nitrocellulose-based rocket propellants containing ethylene cyanohydrin.
2. The propellants of claim 1 wherein the ethylene cyanohydrin is present in an effective gelatinizing and swelling amount.
3. The propellants of claim 1 containing a metal fuel.
4. The propellants of claim 1 containing a solid oxidizer salt.
5. The propellants of claim 1 wherein the nitrocellulose is plastisol grade.
6. The method of forming a nitrocellulose-based rocket propellant which comprises forming a curable rocket propellant slurry containing nitrocellulose and ethylene cyanohydrin, and curing said slurry at about ambient temperature to form a solid rocket propellant.
7. The method of claim 6 wherein curing is carried out for about 2 to 4 days.
8. The method of claim 6 wherein the formulation contains a metal fuel.
9. The method of claim 6 wherein the formulation contains a solid oxidizer salt.

References Cited
UNITED STATES PATENTS

| 608,727 | 8/1898 | Stevens | 149—100 |
| 609,475 | 8/1898 | Stevens | 149—100 |
| 2,146,026 | 2/1939 | Power et al. | 149—100 X |
| 3,104,190 | 9/1963 | Ernsberger et al. | 149—98 |

LELAND A. SEBASTIAN, *Primary Examiner.*

S. J. LECHERT, *Assistant Examiner.*

U.S. Cl. X.R.

149—42, 97, 98

UNITED STATES PATENT OFFICE
CERTIFICATE OF CORRECTION

Patent No. 3,429,755 February 25, 1969

Bernard B. Lampert

It is certified that error appears in the above identified patent and that said Letters Patent are hereby corrected as shown below:

Column 2, line 44, "now limited" should read -- not limited --.

Signed and sealed this 14th day of April 1970.

(SEAL)
Attest:

Edward M. Fletcher, Jr.

Attesting Officer

WILLIAM E. SCHUYLER, JR.

Commissioner of Patents